March 14, 1944.	T. KÜMMICH	2,344,096
OPERATING ARRANGEMENT, PARTICULARLY FOR
CHANGE-SPEED GEARING FOR MOTOR VEHICLES
Filed July 19, 1939	4 Sheets-Sheet 1

INVENTOR
Theodor Kümmich
BY
ATTORNEYS

March 14, 1944. T. KÜMMICH 2,344,096
OPERATING ARRANGEMENT, PARTICULARLY FOR
CHANGE-SPEED GEARING FOR MOTOR VEHICLES
Filed July 19, 1939 4 Sheets-Sheet 3

INVENTOR
Theodor Kümmich
BY
ATTORNEYS

March 14, 1944.    T. KÜMMICH    2,344,096
OPERATING ARRANGEMENT, PARTICULARLY FOR
CHANGE-SPEED GEARING FOR MOTOR VEHICLES
Filed July 19, 1939    4 Sheets-Sheet 4

INVENTOR
Theodor Kümmich
BY
ATTORNEYS

Patented Mar. 14, 1944

2,344,096

UNITED STATES PATENT OFFICE 2,344,096

OPERATING ARRANGEMENT, PARTICULARLY FOR CHANGE-SPEED GEARING FOR MOTOR VEHICLES

Theodor Kümmich, Stuttgart, Germany; vested in the Alien Property Custodian

Application July 19, 1939, Serial No. 285,333
In Germany July 23, 1938

26 Claims. (Cl. 74—473)

The invention relates to an operating arrangement, particularly for change-speed gearing for motor vehicles, especially self-synchronising change-speed gearing with a clutch-operating sleeve and several operating rods located side by side. The invention resides generally in the provision of an element giving a variable transmission ratio between the gear lever and the sleeve such that the portion of the movement of the knob or head of the gear lever utilised for synchronisation is increased and the movement thereof utilised for clutch-dog engagement is reduced in relation to the movement of the sleeve.

In the operation of synchronising devices, two stages of operation are to be distinguished, namely the synchronisation which requires a not inconsiderable expenditure of force and must be performed in a comparatively short movement of the sleeve and the engagement of the clutch dogs which requires only a very slight expenditure of force but calls for a comparatively large movement of the sleeve. The extent of the whole movement of the knob of the gear lever is fixed and, having regard to convenience of operation, cannot be increased. According to the invention, therefore, operation is facilitated by shortening the portion of the whole movement available for clutch-dog engagement, which requires but little force, to the advantage of the portion of the movement available for synchronisation, which requires considerable force. In this fashion, the force to be exerted over a certain movement during synchronisation is reduced and the force to be exerted for the engagement of the clutch dogs is increased, that is a more uniform expenditure of force during the operation is achieved.

The invention is carried into practice by the provision of an element giving a variable transmission ratio between the knob or head of the gear lever and the clutch-operating sleeve, the said element acting upon the operating rods with a constantly varying effect.

The invention is thus of advantage for gearing with a synchronising arrangement because, owing to the variable transmission ration, the force to be exerted at the knob of the gear lever can be made uniform in spite of the varying resistance to operation in the synchronising arrangement. As is known, the resistance arising at the commencement of synchronisation is considerably greater than that at the end of synchronisation and during engagement of the clutch dogs. These two resistance forces multiplied by the respective operating movements of the sleeve give the work to be expended at the knob of the gear lever.

Now, by the provision of the variable transmission ratio, the result may be achieved that the resistance to operation, at the knob of the gear lever, is constant or approximately so. Consequently, a smaller operating force need be exerted upon this knob for the same operating movement or, with a certain operating force, which is dependent upon the masses to be synchronised within a certain time, it is possible to make do with a smaller operating movement at the said knob.

A further advantage of the invention is that the usual finger provided on the gear lever can be in constant engagement with the other operating elements and permits, without force-wasting wedging action and with simple space-saving means, of the selection of the appropriate operating rods for required gear changes and of their actuation in reliable fashion. Owing to the uniformity of the resistance to operation, as felt at the knob of the gear lever, and owing to the avoidance of the wedging members previously common in such operating arrangements, the unpleasant pressure point which has appeared in all self-synchronising gearing hitherto cannot be felt during operation in the case of the invention.

Another advantage of the invention is that, in the case of a fixed or standardised arrangement of gearing and operating rods, the operating order can be adapted to suit any desired scheme, without further reconstruction, merely by the insertion of a different operating sleeve.

Furthermore, the invention permits of the operating means being arranged without, in particular, upwardly projecting parts, so that, with the said operating means arranged at one end of the gearing, the cover of the gear-box may be kept low and flat and welcome freedom for the driver's feet on the floor of the motor vehicle directly above the gearing may be secured.

Finally, the invention is particularly advantageous for five-speed gearing, because it is possible to use only three operating rods. Moreover, the invention is especially advantageous for five-speed gearing wherein a fifth forward speed is provided as a so-called overdrive. The gear-lever movements for the first and second speeds and the third and fourth speeds respectively may then lie in one plane and also the less-used speeds, namely the first and the reverse speeds, may be controlled in simple fashion by one operating rod.

The invention is illustrated in several examples of construction and application in the accompanying drawings, in which:

Figure 4 a cross-section through the arrangement on the line A—A in Figure 1, the sleeve occupying a central position in the transverse direction also, Figure 5 a cross-section similar to Figure 4 with the sleeve displaced transversely, Figure 6 a longitudinal section similar to Figure 1 with the sleeve in a rocked position, Figure 7 a second form of operating arrangement in longitudinal section, with the gear lever offset in relation to the sleeve, Figures 8 to 12 details of the arrangement of Figure 7 in plan view, Figure 13 the arrangement of Figure 7 in cross-section.

In the constructional example in accordance with Figures 1 to 6, the gear lever 1 is mounted in the usual fashion by means of a spherical joint 2 in the cover 3 of the gear box. The operating finger 4 of the gear lever engages by means of a further spherical joint 5 with the actuating lever arm 6 of a sleeve 7 which is mounted in rotatable and longitudinally displaceable fashion upon a transverse rod 8.

Figure 1:
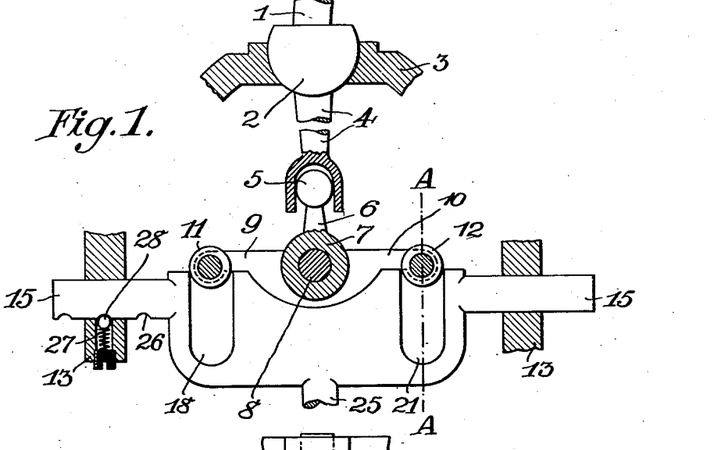
Figure 1 shows one form of operating arrangement in longitudinal section, the operating sleeve occupying a central neutral position, Figure 2 a detail plan view of the sleeve of Figure 1, Figure 3 a detail plan view of three operating rods located side by side.
Figure 2:
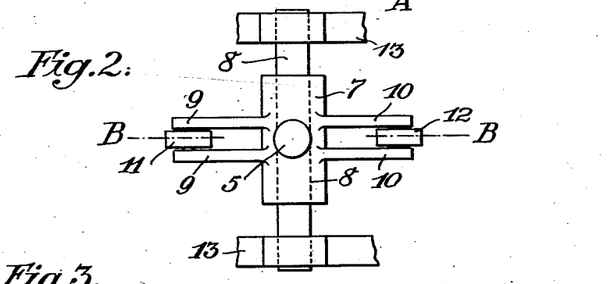
Figure 3:
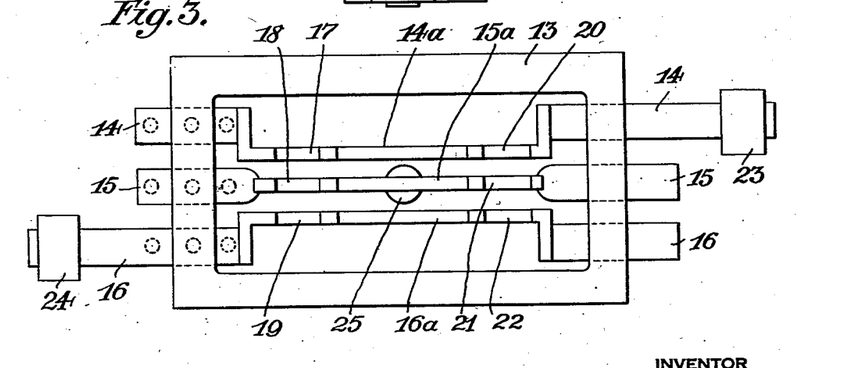

Projecting in opposite directions from the sleeve 8 are pairs of fork arms 9, 9 and 10, 10 respectively between the ends of which small rollers 11 and 12 are rotatably mounted. In the example of Figures 1 to 6, the rollers 11 and 12 lie opposite to each other at the same level in one longitudinal plane B—B (Figures 1 and 2).

Mounted in longitudinally displaceable fashion below the above-described rocker 9, 10, in a frame 13 which may be rigidly connected to the gear box, are three operating rods 14, 15 and 16 which are preferably disposed parallel to one another and which, within the range of rocking of the rocker, run into flat bars or bridge pieces 14a, 15a and 16a disposed on edge. The bridge pieces 14a, 15a and 16a have vertical recesses 17, 18, 19, 20, 21 and 22 (Figure 3) within the range of rocking of the rollers 11, 12. Seen in the transverse direction, the recesses 17, 18, 19 on the one hand and the recesses 20, 21 and 22 on the other hand lie in line. In the example in accordance with Figure 3 the rods 14 and 16 carry, outside the frame 13, on the right-hand and left-hand sides respectively sleeves 23 and 24, for example for supporting an operating dog, a shifting rod for a displaceable clutch part, a displaceable wheel or the like. Similarly a sleeve may be secured on one or both ends of the central rod 15, or a shifting rod 25 or an operating dog may be attached directly to the bridge piece 15a. Self-evidently, within the scope of the invention, such shifting rods or dogs may also be arranged on the bridge pieces 14a and 16a and, conversely, the rod 15 may act upon other or additional shifting rods. It is also possible, within the scope of the invention, to cause the rods to act upon two-armed levers so that the direction of the movement transmitted is reversed.

Each rod, 14—16, has notches or depressions 26 for engagement by detent balls 28, loaded by springs 27, which hold the rod in its operative position for the time being.

Figures 4, 5, 6:
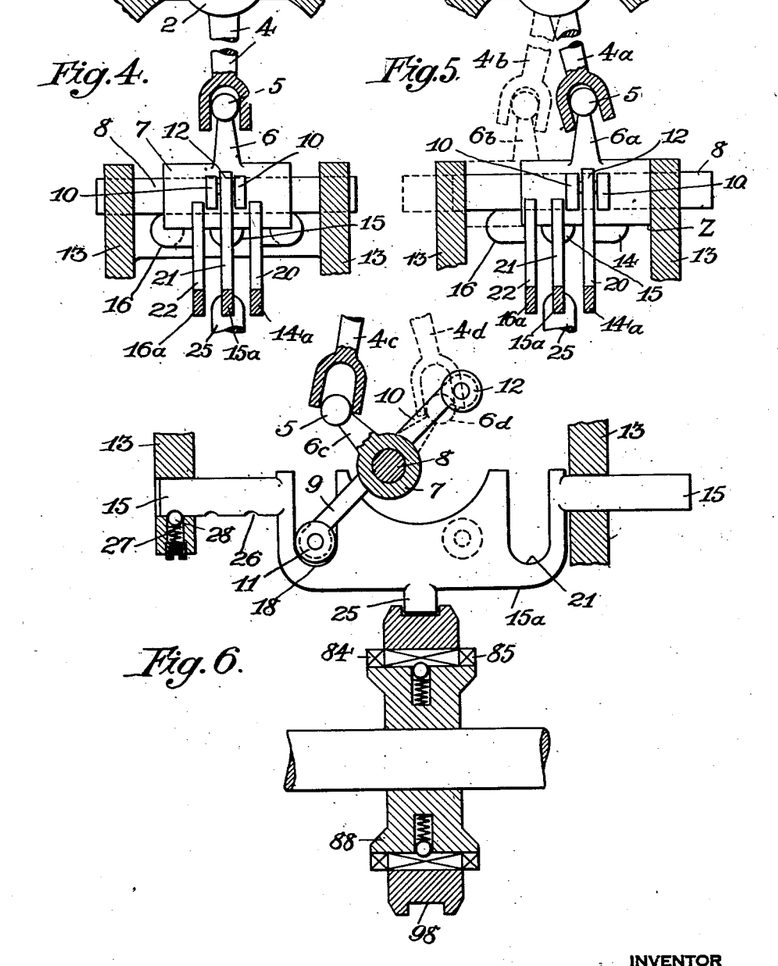

The manipulation and manner of operation of the arrangement described above is as follows:

Depending upon the nature of the gearing to be operated, whose construction may in itself be of any desired kind, first of all preliminary speed-selection is effected by bringing the rocker 9, 10 over that rod 14, 15 or 16, or its bridge piece 14a, 15a or 16a, by which the required shifting member is actuated. Either the gear lever 1 is left in the central position illustrated in Figure 4, in which case the rocker remains in the central position shown, or the said lever is swung so that its finger 4 is rocked into the position 4a or 4b (Figure 5). The rocker accordingly assumes a transverse position displaced either to the right or to the left (Figure 5) whereby the rollers 11 and 12 are brought above the recesses 17, 20 or 18, 21 or 19, 22 which determine the operation to be effected. When this has been done, the gear lever 1 is moved forwardly or rearwardly in the longitudinal direction, whereupon the finger 4 rocks the rocker 9, 10 in the manner shown in Figure 6. Assuming that the rocker is brought to the central position shown in Figure 4 and is then rocked counter-clockwise as shown in Figure 6, the roller 11 enters the recess 18 in the bridge piece 15a of the rod 15. Since the roller 11 describes an arc about the axis 8, the bridge piece 15a is displaced to the left and the shifting rod or operating dog 25 produces the desired action. The movement of the roller 11 in the direction of movement of the rod 15a is initially only slight. Consequently the roller exerts a correspondingly greater operating pressure upon this bridge piece. With progressing rocking movement, the rate of this movement steadily increases but the pressure decreases, likewise steadily, assuming a uniform movement of the gear lever 1 or of its finger 4. The same process takes place if the rocker 9, 10 is swung in the clockwise direction.

In the example described above, the gear lever is arranged directly above the operating rods. Frequently, however, it is desirable to displace the gear lever more or less towards the front end of the gear box in order to secure space directly above the gearing, for example in order to secure a certain freedom for the driver's feet in the case of motor vehicles. Such an arrangement is illustrated in Figures 7 to 13. There the finger 4 of the gear lever 1 engages in a sleeve 29 which is fast upon a rod 30 mounted in rotatable and longitudinally displaceable fashion. A lever arm 33 with a ball-shaped actuating head 34 is mounted at some distance from the sleeve 29 upon the rod 30 by means of a spline arrangement 31, 32 so as to be prevented from rotation, although longitudinally displaceable, in relation thereto. The arm 33 is, however, also prevented by two stops 35, 36 from accompanying the rod 30 in longitudinal movement. On the other hand, the arm 33 can turn with the head 34 between stops 35 and 36 (Figure 8). The said head 34 engages in the fork 37 (Figures 7 and 9) of a two-armed lever 38, 39 which is mounted on the cover 3 of the gear box so as to be swingable about a pivot 40, preferably in a horizontal plane. The rounded end 41 (Figure 9) of the lever arm 39 engages from above in a recess 20 in a second rod 42 displaceable transversely of the rod 30 and the pin 44 of an actuating head 45 belonging to a rocker hereinafter described projects from below into a recess 43 located opposite to the recess 20. The head 45 projects between two transverse bars 46, 46 of a fork frame 47 (Figs. 7 and 10) which is rotatably mounted at the inner end of the rod 30 but is prevented by appropriate guiding means from rotating with the said rod. On the other hand, longitudinal movement of the frame 47 with the rod 30 is possible without hindrance.

Figure 7:
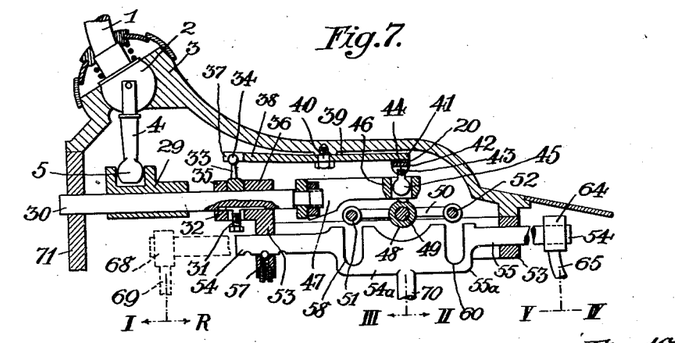
Figures 8, 9:
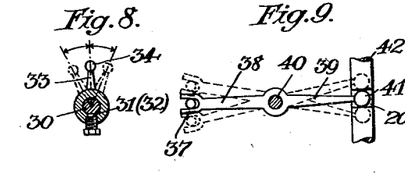
Figure 10:
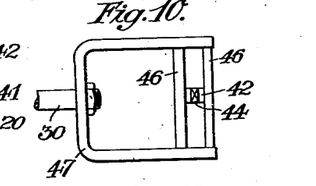
Figure 11:
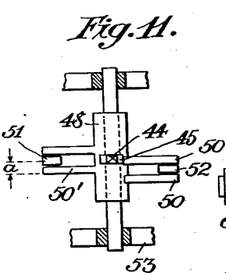
Figure 13:
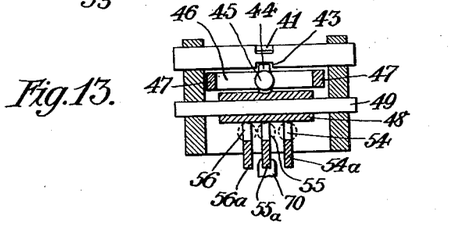

The above-mentioned rocker from which the head 45 projects between the fork members 46, 46 consists, as in the previous example, of a sleeve 48 mounted displaceably upon a rod 49 which is located parallel to the rod 42 (Figures 7, 11 and 13). Projecting from the sleeve 48 in opposite directions, there are two fork arms 50 and 50¹ at whose ends small rollers 51 and 52 are rotatably mounted. In this instance, the rollers 51 and 52 are offset in relation to each other with reference to their longitudinal planes by the distance $a$ (Figure 11).

Three operating rods 54, 55 and 56 are again arranged side by side, below the rocker shown in Figure 11, in a frame 53 in such fashion as to be non-rotatable but longitudinally displaceable. The operative positions of each rod may be determined by a spring-ball detent 57 (Figure 7).

Figure 12:
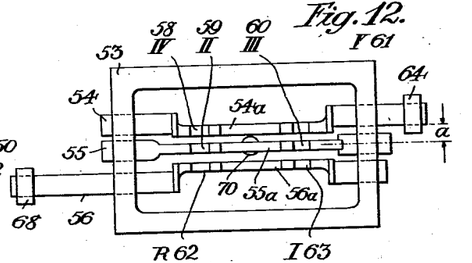

Within the range of rocking of the rocker, the rods 54, 55 and 56 run into flat bridges pieces 54a, 55a, and 56a which stand on edge and are located parallel to one another and a short distance apart. This distance $a$ (Figure 12) corresponds to the offset $a$ between the rollers 51 and 52 (Figure 11) of the rocker. The bridge pieces 54a, 55a and 56a have vertical recesses 58, 59, 60, 61, 62 and 63 (Figure 12) within the range of rocking of the rollers. Referring to Figures 7 and 12, the rod 54 has at its right-hand end a sleeve 64 with an operating fork 65 (Figure 7). The rod 56 carries a similar sleeve 68 with a fork 69 at the left-hand end. The fork 70 of the rod 55 is directly attached to the bridge piece 55a of this rod.

Figure 14:
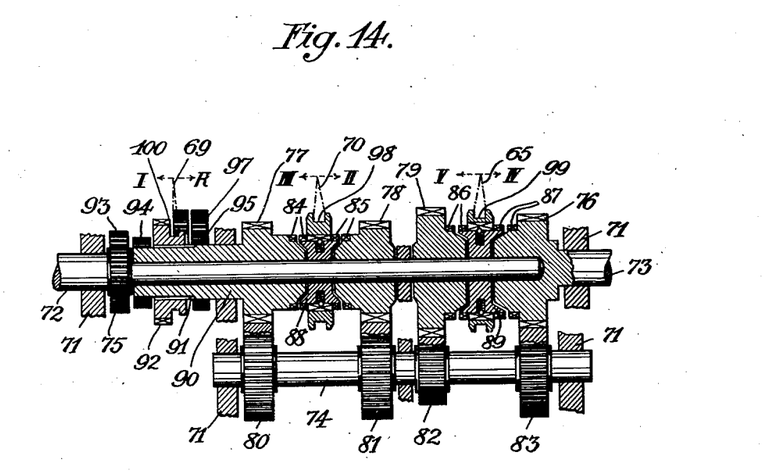
Figure 14 a five-speed change-speed gearing with a synchronizing arrangement to which the operating arrangement is advantageously applicable, in longitudinal section, and Figure 15 an operating diagram for the arrangement in accordance with Figures 7 to 13 or for the gearing in accordance with Figure 14.

In Figure 14, the operating forks 65, 69 and 70 are indicated by broken lines. In the illustrated gearing actuated by these forks, a driving shaft 72, a driven shaft 73 located in alignment therewith and a counter-shaft 74 are mounted in the gear-box housing 71. The driving shaft 72 carries a fixed toothed wheel 75 immediately at its point of entry into the housing 71 and, similarly, a wheel 76 is fixed upon the driven shaft 73 near the wall of the housing. Wheels 77, 78 and 79 are mounted so as to be non-displaceable longitudinally but freely rotatable upon the driving shaft 72. The wheels 76, 77, 78 and 79 are permanently in mesh with wheels 80, 81, 82 and 83 which are fast upon the counter-shaft 74. The sides adjacent to each other of the wheel pairs 77, 78 and 79, 76 are constructed as the halves 84, 85, 86 and 87 of clutches and between these wheel pairs change-speed clutch parts 88 and 89 are mounted upon the driving shaft 72 in relatively non-rotatable but longitudinally displaceable fashion. These clutch parts are constructed as synchronising clutch halves for both of their directions of movement so that the final connection of the parts to be coupled together is only effected when they have approximately the same revolution speed. The construction of each synchronising clutch as a combined friction and dog clutch is preferred, the dog-clutch part being displaceable against resistance upon the friction-clutch part and the friction-clutch parts coming into engagement before the dog-clutch parts. The wheel 77 has also a sleeve 90 extending towards the wheel 75. This sleeve is provided externally with splines or grooves 91 and a displaceable wheel 92 slides non-rotatably thereon. The wheel 75 on the driving shaft 72 is in permanent mesh with one wheel 93 of a preliminary gearing and the same shaft of the preliminary gearing carries two further fixed wheels 94 and 95. The wheel 95 meshes in turn with an intermediate wheel 96 with which rotates a wheel 97 on the same intermediate shaft. The wheel 92 on the sleeve 90 may be brought alternatively into engagement with either the wheel 94 or the wheel 97. The clutches 88 and 89 are operated by sleeves 98 and 99 and the wheel 92 is moved by a third sleeve 100. As Figure 14 shows, the operating fork 65 engages in the sleeve 99, the fork 70 in the sleeve 98 and the fork 69 in the sleeve 100.

Figure 15:
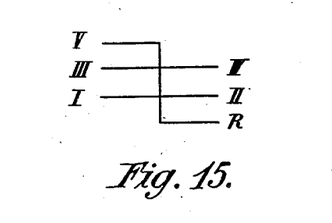

The operating diagram for the gear lever 1 for an arrangement in accordance with Figures 7 to 13 in combination with gearing in accordance with Figure 14 is illustrated in Figure 15. The manipulation and manner of operation of the arrangement in accordance therewith are as follows:

Upon swinging the gear lever 1 in the direction only of the plane of the drawing (Figure 7), the finger 4 swings oppositely and causes longitudinal displacement of the rod 30 with the fork frame 46, 47. The fork members 46 then act in the same direction upon the actuating member 45 of the rocker 50, 50¹ and rock the latter. The downwardly swinging roller 51 or 52 of this rocker enters into the particular recess 58 to 63 located under it in a bridge piece 54a—56a of an operating rod 54—56 and moves the same in the opposite direction to the rod 39 so that the required action is initiated.

Similarly the finger 4 executes an opposite movement to the gear lever 1 when the latter is swung transversely, i. e., at right angles to the plane of the paper. The transverse movement of the finger 4 causes rotation of the rod 30. Accordingly the lever arm 33 with the knob 34 also executes a turning movement (Figure 8) and causes, through the fork 37, a swinging movement of the two-armed lever 38, 39 (Figure 9). The end 41 of the two-armed lever displaces the rod 42 (Figure 13) which in turn displaces the actuating member 45 in the transverse direction between the fork members 46. Consequently, the rocker 50, 50¹ (Figure 11) also executes a transverse movement and the rollers 51 and 52 are thereby brought over respective recesses 58—63 in the bridge pieces 54a—56a of the operating rods 54—56 so that, upon subsequent longitudinal movement of the gear lever in the above-described fashion, a certain roller comes into engagement with a certain rod and the operating movement is completed as described above. The various speeds are engaged by a movement of the gear lever in accordance with the diagram in Figure 15. The several recesses in the rods are indicated in Figure 12 by the numbers of the speeds. The directions of operation may be gathered both from Figure 7 and also from Figure 14.

For the first speed, the wheel 92 is brought into engagement with the wheel 94. The wheel 75 on the shaft 72 drives the wheel 93 and the wheel 94 drives the displaceable wheel 92. The wheel 92 carries along the sleeve 90 and the wheel 77 by reason of the spline connection 91 and the wheel 77 drives the wheel 80 fast on the shaft 74. The drive is finally transmitted by way of the wheel pair 83, 76.

For the second speed, the clutch part 88 is brought into engagement with the clutch half 85. In this fashion, the wheel 78 is clutched to the driving shaft 72 and drives the shaft 74 through the wheel 81. The drive is again finally transmitted by way of the wheel pair 83, 76.

For the third speed, the clutch part 88 is brought into engagement with the clutch half 84. In this fashion, the wheel 77 is coupled to the driving shaft 72 and drives the shaft 74 through the wheel 80. The drive is again finally transmitted through the wheel pair 83, 76.

For the fourth speed, the clutch part 89 is brought into engagement with the clutch half 87. The wheel 76 which is fixed directly upon the driven shaft is connected to the driving shaft 72. Consequently the fourth speed is the direct speed.

For the fifth speed, the clutch part 89 is brought into engagement with the clutch half 86. In this fashion, the wheel 79 is connected to the driving shaft 72 and drives the shaft 74 through the wheel 82. The drive is again finally transmitted through the wheel pair 83, 76.

For the reverse speed, the displaceable wheel 92 is brought into engagement with the wheel 97 whereby the wheel 92, in comparison with the case of its engagement with the wheel 94 for the first speed, experiences a reversal of its direction of rotation. Otherwise the power transmission and movement takes place, precisely as for the first speed, by way of the wheel pairs 77, 80 and 83, 76. In this case also, the drive is finally transmitted by the wheel pair 83, 76.

In connection with this mode of operation, it is notable that there is a constant final drive 83, 76 for all indirect speeds. This arrangement in accordance with the invention has the advantage that all wheel pairs on both sides of the synchronising clutches are always drivingly connected to the driven shaft or, in the case of vehicles, to the Cardan shaft. Consequently, only a small synchronising force is necessary and not only is the loading of the synchronising clutches slight but also the operating device is of small size.

The operating diagram for the gear lever naturally depends upon the arrangement of the operating rods and also upon the offset of the rollers on the rocker. For instance, within the scope of the invention, it would be possible to construct the preliminary gearing, including the first and reverse speeds, as a so-called silent gearing with permanently meshing toothed wheels and to operate the same by means of synchronising clutches. Similarly, within the scope of the invention, the functions of the clutch 88 between the wheels 77 and 78 may be interchanged so that the first speed and the reverse speed include the ratio of the second speed. In place of the rollers 51 and 52 on the rocker 50, 50¹, provision may naturally be made of any other desired kind of engagement members, such as sliding blocks. Similarly the individual rods may carry any desired number of operating forks in any desired arrangement. Furthermore, there is no reason why the rocker should not be provided with more than two operating arms 50, 50¹, the length of the lever arm of the actuating member 45 and the lengths of the said arms being suitably proportioned in any desired fashion. Within the scope of the invention, it is further possible to provide several rockers instead of one and also several actuating levers 33 (Figs. 7 and 8).

I claim:

1. Operating arrangement for change-speed gearing, comprising at least one synchronising clutch with a sleeve member, a synchronising device and a dog clutch, clutch-operating rods, a gear lever, and a transmission element between the said sleeve member and gear lever in the form of a sleeve with three lever arms, two of the said lever arms being engageable with the operating rods and disposed opposite to each other in a horizontal plane whilst the third lever arm, which is operatively connected to the gear-lever, is substantially perpendicular to the others.

2. Operating arrangement according to claim 1, wherein members such as rollers are arranged on the ends of the two oppositely disposed lever arms and slots are provided in the operating rods in which the said members are engageable.

3. Operating arrangement for change-speed gearing comprising at least one synchronising clutch with a sleeve member, a synchronising device and a dog clutch, at least one clutch- or gear-operating rod, a gear lever, a transverse rod located transversely to said clutch-operating rod, and a sleeve carrying three arms mounted upon the said transverse rod so as to be rockable and displaceable transversely thereon above the three operating rods, two of the arms being disposed opposite to each other and provided at their ends with rollers engageable with the operating rods whilst the third arm is operatively connected to the gear lever.

4. Operating arrangement for change-speed gearing, comprising at least one synchronising clutch with a sleeve member, a synchronising device and a dog clutch, a gear lever, a rockable member connected to the gear lever, at least one clutch- or gear-operating rod, a rod located transversely of the said clutch-operated rod, and a sleeve carrying three arms mounted upon the said transverse rod, two of the said arms being disposed in a horizontal plane and provided at their ends with members engageable with the clutch-operating rods and a third arm being disposed perpendicularly to the others and connected to the rockable member by a spherical joint.

5. Operating arrangement for change-speed gearing, comprising at least one synchronising clutch with a sleeve member, a synchronising device and a dog clutch, a gear lever, a rockable member connected to the gear lever, at least two clutch- or gear-operating rods, a rod located transversely of the said rods, and a sleeve carrying three arms mounted upon the said transverse rod, two of the said arms being disposed in a horizontal plane and provided at their ends with members engageable with the clutch-operating rods and a third arm being disposed perpendicularly to the others and connected to the rockable member, the said two arms being offset laterally in relation to each other by an amount equal to the spacing of the clutch-operating rods.

6. Operating arrangement for change-speed gearing, comprising gear-changing sleeve members, rods for operating the said members, a gear lever and transmission means between the said lever and rods consisting of a sleeve with two arms which are disposed opposite to each other and carry rollers, the rods being arranged transversely to said two arms and being formed there as flat bars disposed on edge with recesses for engagement by the rollers on the arms.

7. Operating arrangement according to claim 6, wherein forks in engagement with the sleeve members are provided on the operating rods.

8. The combination according to claim 6, in combination with forks on said operating rods engaging said gear-changing sleeve members, and a two-armed lever intermediate said gear lever and said two-armed sleeve, whereby a reverse movement relatively to the movement of said gear lever is transmitted to said two-armed sleeve and thence to said operating rods and gear-changing sleeve members.

9. Operating arrangement according to claim 6 for a gearing with five speeds and reverse, wherein there are three operating rods, the first operating rod controlling the fourth and fifth speeds, the intermediate rod the second and third speeds, and the third rod the first and reverse speeds.

10. Operating arrangement according to claim 6, wherein the gear lever is extended beyond its pivot in the form of a finger and the gear lever and sleeve are offset towards opposite ends of the gear box, the said finger being connected to the actuating part of the sleeve by intermediate members which reverse the direction of the movement transmitted to the sleeve.

11. Operating arrangement according to claim 6 and comprising further a finger forming an extension of the gear lever beyond its pivot, a rotatable and longitudinally displaceable rod with which the finger is engaged, an actuating arm mounted in relatively non-rotatable but longitudinally displaceable manner upon the said rod, stops holding the said arm against longitudinal displacement, a fork-frame rotatably connected to the said rod and engaged with one of the arms of the sleeve, and a two-armed lever whose arms are coupled one with the aforesaid actuating arm and the other with the said one of the arms of the sleeve.

12. Operating arrangement according to claim 6 and comprising further a finger forming an extension of the gear lever beyond its pivot, a rotatable and longitudinally displaceable rod with which the finger is engaged, an actuating arm mounted in relatively non-rotatable but longitudinally displaceable manner upon the said rod, stops holding the said arm against longitudinal displacement, a fork-frame rotatably connected to the said rod and engaged with one of the arms of the sleeve, and a two-armed lever whose arms are coupled one with the aforesaid actuating arm and the other with the said one of the arms of the sleeve, in combination with gearing consisting of a gear box in which are mounted the aforesaid rotatable and longitudinally displaceable rod and aligned driving and driven shafts, a wheel fast upon the driving shaft, a wheel fast upon the driven shaft before its emergence from the gear box, a counter-shaft with four wheels fast upon it, one meshing with the wheel fast upon the driven shaft and three with three wheels free upon the driving shaft, speed-changing synchronising clutches between pairs of these last four wheels, a sleeve connected to one of the wheels free on the driving shaft, a displaceable wheel on the said sleeve, and a preliminary-gear shaft having a wheel in constant mesh with the wheel fast upon the driving shaft, a speed-changing wheel beside the former wheel and reversing wheels for the reverse speed.

13. The combination according to claim 3, in which said gear lever is provided with a depending finger and said third arm is a crank-arm engaged and movable by said finger.

14. In a gear shifting mechanism for change speed gears, a gear shift lever having a pair of substantially oppositely directed lever arms, means for journaling said gear shift lever for turning movement about an axis substantially perpendicular to the plane of said lever arms, and a gear shifting device movable substantially transversely to said turning axis, having two substantially rectilinear guiding surfaces each lying in a plane parallel to said turning axis and perpendicular to the direction of movement of said gear shifting device, said guiding surfaces respectively cooperating with the ends of one or the other of said lever arms upon a turning of said gear shift lever in the one or the other direction about its turning axis, so that the end of one or the other lever arm comes into engagement with the one or the other guiding surface of the transversely movable gear shifting device, and by gliding along the guiding surface moves said gear shifting device in the one or the other direction, the path of said guiding surfaces forming an increasingly greater angle with the swinging arcs of said lever arms about said turning axis, so that the force to be expended upon the shifting lever for the movement of said gear shifting device upon sliding of said lever arms along said guiding surfaces changes along the guiding surface with the turning of the gear shift lever.

15. In a gear shifting mechanism for change speed gears, a gear shift lever having a pair of substantially oppositely directed lever arms and a third lever arm, a gear shift lever actuating device adjusting said gear shift lever by means of said third lever arm, means for journaling said gear shift lever for turning movement about an axis substantially perpendicular to the plane of said pair of lever arms, and a gear shifting device movable substantially transversely to said turning axis, said shifting device having two substantially rectilinear guiding surfaces each lying in a plane parallel to said turning axis and perpendicular to the direction of movement of said gear shifting device, said guiding surfaces respectively cooperating with the ends of one or the other of said pair of lever arms upon a turning of said gear shift lever in the one or the other direction about its turning axis, so that the end of the one or the other of said pair of lever arms comes into engagement with the one or the other guiding surface of the transversely movable gear shifting device, and by sliding along the guiding surface moves said gear shifting device in the one or the other direction.

16. In a gear shifting mechanism for change speed gears, a gear shift lever having a pair of substantially oppositely directed lever arms, means for journalling said gear shift lever for turning movement about an axis substantially perpendicular to the plane of said lever arm, and a gear shifting device movable substantially transversely to said turning axis, having two guiding surfaces each lying in a plane parallel to said turning axis and perpendicular to the direction of movement of said gear shifting device, said guiding surfaces respectively cooperating with the ends of one or the other of said lever arms upon a turning of said gear shift lever in the one or the other direction about its turning axis, so that the end of one or the other lever arm comes into engagement with the one or the other guiding surface of the transversely movable gear shifting device, and by sliding along the guiding surface moves said gear shifting device in the one or the other direction, said transversely shiftable gear shifting device comprising a shift bar formed partially as a plate provided with guiding slots for said guiding surfaces for the guiding of the ends of said lever arms.

17. In a gear shifting mechanism for speed change gears, a gear shift lever having two substantially oppositely directed lever arms axially shiftable upon and pivotally mounted about an axis, at least two gear shifting members shiftable substantially transversely to the axis of said gear shift lever, each provided with guiding surfaces each lying in a plane parallel to said turning axis and perpendicular to the direction of movement of said gear shifting device, the guiding surfaces of one or the other of said gear shifting members cooperating with the ends of the one or the other of said lever arms upon a proper axial shifting and turning of said gear shift lever in the one or the other direction about its axis, so that the ends of the one or the other lever arm come into engagement with the one or the other guiding surface of one or the other of said gear shifting member, and by gliding along said guiding surface moves said gear shifting member in the one or the other direction, and means for axially shifting said gear shift lever and turning the same about its axis.

18. In a gear shifting mechanism for speed change gears, a gear shift lever having two substantially oppositely directed lever arms axially shiftable upon and pivotally mounted about an axis, at least two gear shifting members shiftable substantially transversely to the axis of said gear shift lever, each provided with guiding surfaces lying in a plane parallel to said turning axis and perpendicular to the direction of movement of said gear shifting device, the guiding surfaces of one or the other of said gear shifting members cooperating with the ends of the one or the other of said lever arms upon a proper axial shifting and turning of said gear shift lever in the one or the other direction about its axis, so that the ends of the one or the other lever arm come into engagement with the one or the other guiding surface of one or the other of said gear shifting member, and by sliding along said guiding surface moves said gear shifting member in the one or the other direction, the path of said guiding surfaces forming an increasingly greater angle with the swinging arcs of said lever arms about said turning axis so that the force to be expended on the gear shift lever for the movement of said gear shifting members upon a sliding of the lever arm along the guiding surfaces changes along the guiding surfaces with the turning of the gear shift lever.

19. In a gear shifting mechanism for speed change gears, a gear shift lever having two substantially oppositely directed lever arms axially shiftable upon and pivotally mounted about an axis, at least two gear shifting members shiftable substantially transversely to the axis of said gear shift lever, each provided with guiding surfaces each lying in a plane parallel to said turning axis and perpendicular to the direction of movement of said gear shifting device, the guiding surfaces of one or the other of said gear shifting members cooperating with the ends of the one or the other of said lever arms upon a proper axial shifting and turning of said gear shift lever in the one or the other direction about its axis, so that the ends of the one or the other lever arms come into engagement with the one or the other guiding surface of one or the other of said gear shifting members, and by sliding along said guiding surface moves said gear shifting member in the one or the other direction, a gear shift actuating rod, means for shifting and turning said gear shift actuating rod, means for coupling said gear shift actuating rod with said gear shift lever in such a manner that upon a shifting of the gear shift actuating rod said gear shift lever is turned about its axis, and an intermediate lever coupled with said gear shift actuating rod and with said gear shift lever in such a manner that upon a turning of said gear shift actuating rod said intermediate lever is turned and axially displaces said gear shift lever.

20. In a gear shifting mechanism for change speed gears, a gear shift lever axially shiftable and turnable for shifting of the change-speed gears, a gear shift actuating rod coupled with said gear shift lever in such a manner that upon a shifting of the gear shift actuating rod said gear shift lever is turned about its axis, means for shifting and turning said gear shift actuating rod, and an intermediate two-armed lever coupled at one end with said gear shift actuating rod and at its other end with said gear shift lever in such a manner that upon turning of said gear shift actuating rod said intermediate lever is turned and axially shifts said gear shift lever.

21. A gear shifting device for a change-speed transmission having a set of continually engaged gear wheels having one gear wheel mounted loosely on its shaft, said device comprising a synchronizing clutch including a sleeve member having a synchronizing device and a dog clutch for engaging said one gear wheel, a rotatably mounted gear-shift lever having a head, a control finger forming an extension of said lever, an axially shiftable gear-shift bar operatively connected to said clutch, and a rockable transmission element coupled to said finger, means operatively connecting said transmission element to said gear-shift bar, the last mentioned means being arranged to produce variable leverage in such a manner that the portion of the movement of the gear-shift lever head for synchronizing is amplified with respect to the movement of said gear-shift lever head and that portion of the movement of said gear-shift lever head for engagement of the dog clutch is reduced, said transmission element having at least one arm extending substantially radially and in the direction of said gear-shift bar, said gear-shift bar being provided with a substantially rectilinear surface extending substantially at right angles to the direction of its movement, along which surface said arm slides upon rotation of said transmission element about its axis so as to shift said gear-shift bar a varying amount.

22. A gear shifting device for a change-speed transmission having a set of continually engaged gear wheels having one gear wheel mounted loosely on its shaft, said device comprising a synchronizing clutch including a sleeve member having a synchronizing device and a dog clutch for engaging said one gear wheel, a rotatably mounted gear-shift lever having a head, a control finger forming an extension of said lever, an axially shiftable gear-shift bar operatively connected to said clutch, and a rockable transmission element coupled to said finger, means operatively connecting said transmission element to said gear-shift bar, the last mentioned means being arranged to produce variable lever in such a manner that the portion of the movement of the gear-shift lever head for synchronizing is amplified with respect to the movement of said gear-shift lever head and that portion of the movement of said gear-shift lever head for engagement of the dog clutch is reduced, said transmission element having at least one arm extending substantially radially and in the direction of said gear-shift bar, said gear-shift bar being provided with a substantially rectilinear surface extending substantially at right angles to the direction of its movement, along which surface said arm slides upon rotation of said transmission element about its axis so as to shift said gear-shift bar a varying amount, the outer end of said arm having a roller arranged to roll on said surface as said transmission element is rotated on its axis.

23. In a gear-shifting mechanism for change speed gears, a gear-shifting bar mounted for end-wise movement, a pair of longitudinally spaced substantially rectilinear cam surfaces formed on said gear-shifting bar, said cam surfaces extending substantially parallelly with respect to each other and substantially at right angles to the length of the gear-shifting bar, a rockable shifting element mounted to rock on an axis extending substantially at right angles to the length of the gear-shifting bar, a pair of laterally projecting arms on said shifting element, the related arms having cam portions movably engageable with the said cam surfaces one at a time to shift said gear-shifting bar in a corresponding direction, and control means operatively connected to rock said rockable shifting element on its axis in either direction.

24. In a gear-shifting mechanism according to claim 23 wherein the axis of said rockable shifting element is located between the said pair of cam surfaces.

25. In a gear-shifting mechanism for change-speed gears, a gear-shifting bar mounted for end-wise movement, a pair of longitudinally spaced notches formed on said gear-shifting bar, the opposite walls of the notches being in the form of substantially parallel cam surfaces extending substantially at right angles to the length of the gear-shifting bar, a shifting element comprising a pair of longitudinally spaced cams arranged to project into the notches, and means mounting said shifting element for rocking movement on an axis located intermediate its cams and between the notches with the axis extending substantially at right angles to the length of the gear-shifting bar, and means for rocking said shifting element on its axis to engage one or the other of its cams with one or the other of the cam surfaces of the notches to move said gear-shifting bar in a corresponding direction at a varying rate.

26. In a change-speed mechanism involving selectively controllable gears, means for effectively engaging the gears, a plurality of gear-shifting bars each operatively connected to at least one of said means, said shifting bars being mounted for end-wise movement and substantially parallel to each other, each shifting bar being formed with a pair of longitudinally spaced notches extending substantially at right angles to the length thereof, each pair of notches providing a pair of opposed cam surfaces, a single shifting element comprising a pair of spaced cams for engaging simultaneously or one at a time in a pair of notches in any shifting bar, means mounting said single shifting element for rocking and sliding on an axis located intermediate the pairs of notches, and control means for sliding said single shifting element along its axis to select one of the gear-shifting bars and for then rocking said shifting element on its axis to impart end-wise movement to the corresponding gear-shifting bar.

THEODOR KÜMMICH.